US006464443B2

(12) United States Patent
Schlüsselbauer

(10) Patent No.: US 6,464,443 B2
(45) Date of Patent: Oct. 15, 2002

(54) INSTALLATION FOR HARDENING TUBULAR CONCRETE WORKPIECE

(76) Inventor: Johann Schlüsselbauer, Obergmain 2, A-4674 Altenhof am Hausruck (AT)

(*) Notice: Subject to any disclaimer, the term of this patent is extended or adjusted under 35 U.S.C. 154(b) by 0 days.

(21) Appl. No.: 09/892,808

(22) Filed: Jun. 27, 2001

(65) Prior Publication Data

US 2002/0001514 A1 Jan. 3, 2002

(30) Foreign Application Priority Data

Jun. 28, 2000 (AT) .............................................. 1102/00

(51) Int. Cl.[7] ............................................... B65G 65/08

(52) U.S. Cl. ....................... 414/325; 414/626; 414/910; 212/319; 212/327

(58) Field of Search ................................ 414/626, 325, 414/910; 212/319, 327

(56) References Cited

U.S. PATENT DOCUMENTS 4,412,817 A * 11/1983 Schmidgall ................. 432/247
6,000,904 A * 12/1999 Schlusselbauer ......... 414/792.9

FOREIGN PATENT DOCUMENTS

AT 405 395 7/1999

* cited by examiner

*Primary Examiner*—Steven A. Bratlie
(74) *Attorney, Agent, or Firm*—Collard & Roe, P.C.

(57) ABSTRACT

An installation is described for hardening tubular concrete workpieces (1) in chambers (2) which are open at the top, can be closed with cover plates (3) and can be subjected to vapor and which can be charged with the aid of an overhead travelling crane (6) bearing a hoist (9) for workpieces (1). In order to achieve an advantageous construction constellation it is recommended that the overhead travelling crane (6) for the workpieces (1) has a gripping device for the cover plates (3) of the chambers (2).

6 Claims, 5 Drawing Sheets

INSTALLATION FOR HARDENING TUBULAR CONCRETE WORKPIECE

FIELD OF THE INVENTION

The invention concerns an installation for hardening tubular concrete workpieces in chambers which are open at the top, can be closed with cover plates, can be filled with vapour and which can be charged with the aid of an overhead travelling crane bearing the load of the workpieces.

DESCRIPTION OF THE PRIOR ART

After tubular, concrete workpieces such as concrete pipes, tubbing rings or well casings have been removed from the mould, these workpieces must be placed into an interim storage facility to allow the concrete to harden. This is done with consideration being given to the fact that the concrete is yet to harden and can only be subjected to minimal load in an upright position. Overhead travelling cranes with a hoisting device (AT 405 395 B) are used to transport the tubular workpieces which include an encompassing, metallic bottom ring for setting them down. Said cranes consist of a supporting frame which runs above the workpieces to be picked up and brackets which encircle the exterior of the workpiece. Said brackets reach under a flange located in the metallic bottom ring by means of adjustable dogs which are perpendicular to the axis of the workpiece and which lift it. With the aid of such overhead travelling cranes, the workpieces can be stored in an appropriate storage area and allowed to harden after they have been removed from the mould and can then be transported from this storage area after hardening.

If the tubular workpieces are subjected to vaporisation to facilitate more effective hardening, the workpieces must be placed in chambers for hardening which are closed for vaporisation. To achieve this, chambers are known which are open at the top and which are closed by means of cover plates. To load and unload the chambers the cover plates must be opened before the workpieces can be inserted or removed. Due to the size of the relatively heavy cover plates, their opening and closing requires measures involving significant effort which must not hinder the movement of the workpieces either. In order to avoid having to allocate a special opening and closing device for each cover plate, in known installations the cover plates share a common lifting device which is driven along the row of chambers, with attention needing to be paid to the transportation routes of the overhead travelling crane employed for workpiece charging in order to avoid mutual interference. In order for charging and discharging to occur, the individual workpieces do not only have to be lowered into and lifted out of the single chambers which are open at the top, but must also be transported away from the chambers at a distance above them.

SUMMARY OF THE INVENTION

The aim of the invention is to provide an installation for hardening tubular concrete workpieces of the type described at the outset such that the construction for opening and closing the cover plates can be significantly simplified.

The invention fulfils this aim by incorporating a holding device for the cover plates into the overhead travelling crane used for the workpieces.

As the overhead travelling crane used for the workpieces includes a holding device for cover plates, there is no longer any need for a separate lifting device for the cover plates, which are now lifted off the chambers and replaced onto them by the overhead crane used for the workpieces before and after the workpieces have been transported. One must only ensure that the weight of a cover plate does not exceed the permissible load rating of the overhead crane. In order to suffice with an overhead crane designed to work with the weight of the workpieces, the chamber cover plates can be divided into removable cover plate segments of less weight accordingly.

In order to set down the cover plates removed from the chambers, a stackable storage facility for the cover plates can be located at the end of the row of chambers which are oriented in the direction of travel of the overhead crane so that the workpieces can be transported without interference after the cover plates have been stacked. A particularly simple construction constellation results in this case if the stackable storage facility for the cover plates is arranged in the area near the discharging station of a feeder conveyor for the workpieces to be hardened and/or in the area near the charging station of a discharge conveyor for the hardened workpieces as in this case a workpiece requiring hardening can be picked up and transported into the opened chamber after the cover plate has been set down without the overhead crane having to make an additional empty run. Similarly, no further conveyer travel is required for the overhead crane to convey a stockpiled cover plate to the open chamber after a hardened workpiece has been removed from it.

Although the overhead crane for the workpieces can be provided with a holding device designed specifically for each cover plate's dimensions, a particularly simple construction constellation results if the hoist for the workpieces is insertable. Preferably, this hoist shall consist of a supporting frame which runs above the standing workpieces to be picked up and of brackets which are arranged on the supporting frame and which encompass the workpieces externally and which have dogs which are adjustable along an axis lying at right angles to the axis of the workpiece and grip under a flange located on the bottom ring of the workpieces. In this case the chamber cover plates only need to have pick-up recesses which have been modified to accommodate the bracket arrangement for the dogs, which are located on the brackets of the hoisting device, to then be able to be inserted into the pick-up recesses when adjusted accordingly, connecting each cover plate to the bracket of the hoist.

An especially advantageous way of handling the cover plates to be opened and closed during charging of the chambers can be achieved if the opened chambers are not closed with a cover plate from the stackable storage facility, but with the cover plate from the chamber opened immediately beforehand which is then to be loaded. This means that after a chamber cover plate has been stacked in the storage facility, the chamber concerned shall not be closed with the stacked cover plate any longer, but preferably with the cover plate of the neighbouring chamber which has been opened to remove the fully hardened workpieces and to receive workpieces requiring hardening, while the cover plate stacked in the storage facility is to be used to close the final chamber opened.

BRIEF DESCRIPTION OF THE DRAWING

The drawing shows one embodiment of the invention.

DESCRIPTION OF THE PREFERRED EMBODIMENTS

The installation for hardening tubular workpieces 1 features numerous adjacent chambers 2 which are open at the top and can be closed with cover plates 3 in order to be able to subject the workpieces 1 located in the chambers 2 to a vaporising process to achieve more effective hardening. In accordance with this design embodiment, each of the cover plates 3 of the individual chambers 2 are subdivided into three cover plate segments 4, each of which can be individually removed from the chambers 2. Due to the resultant reduction in the weight and the reduced dimensions of the cover plate segments 4, this subdivision of the cover plates 3 results in the facilitation of the handling of the cover plates 3 when the chambers 2 are opened and closed.

Figure 3:
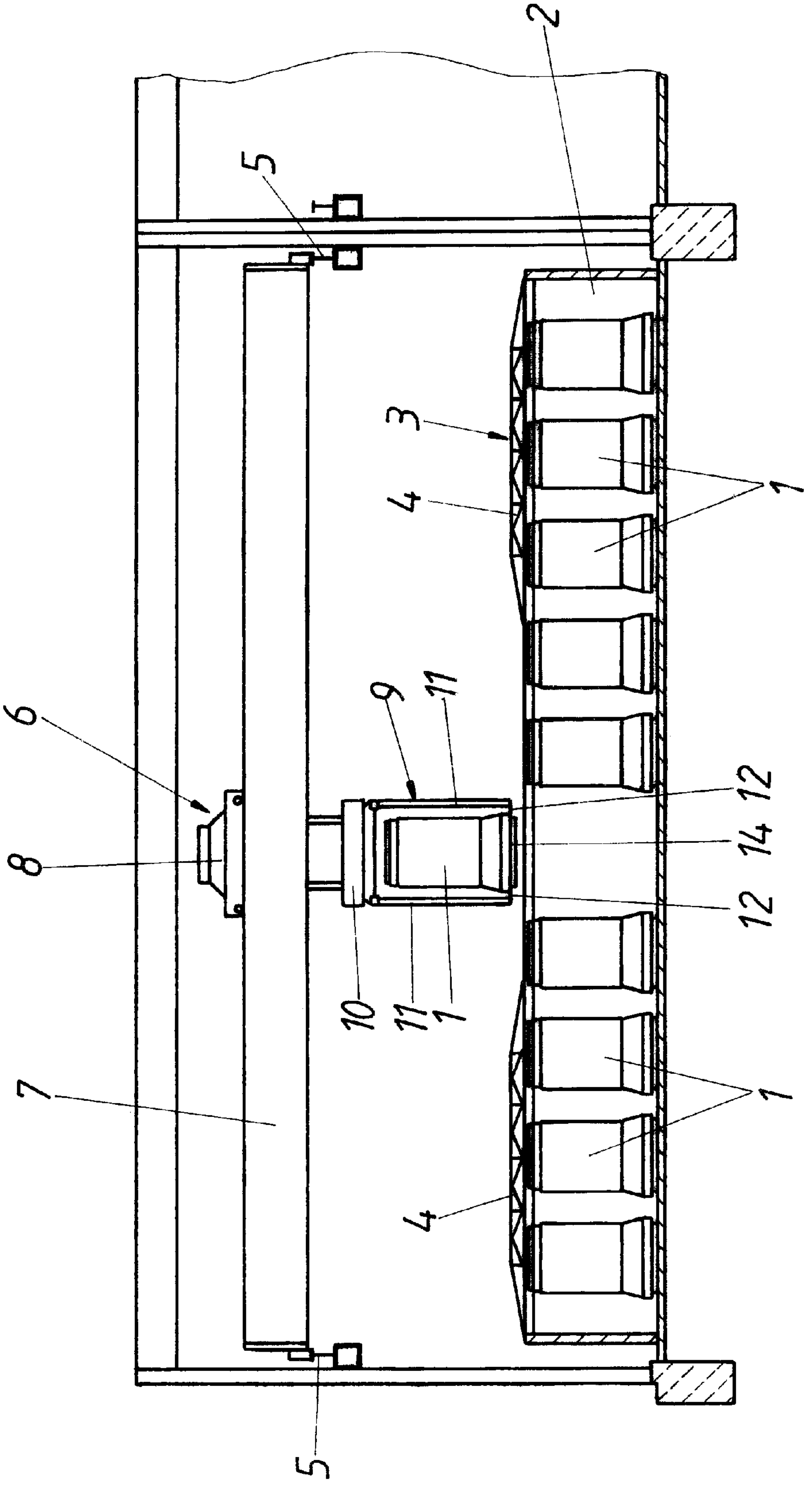
FIG. 3 shows the section corresponding to FIG. 2 illustrating a workpiece being held by the overhead crane.
Figure 4:
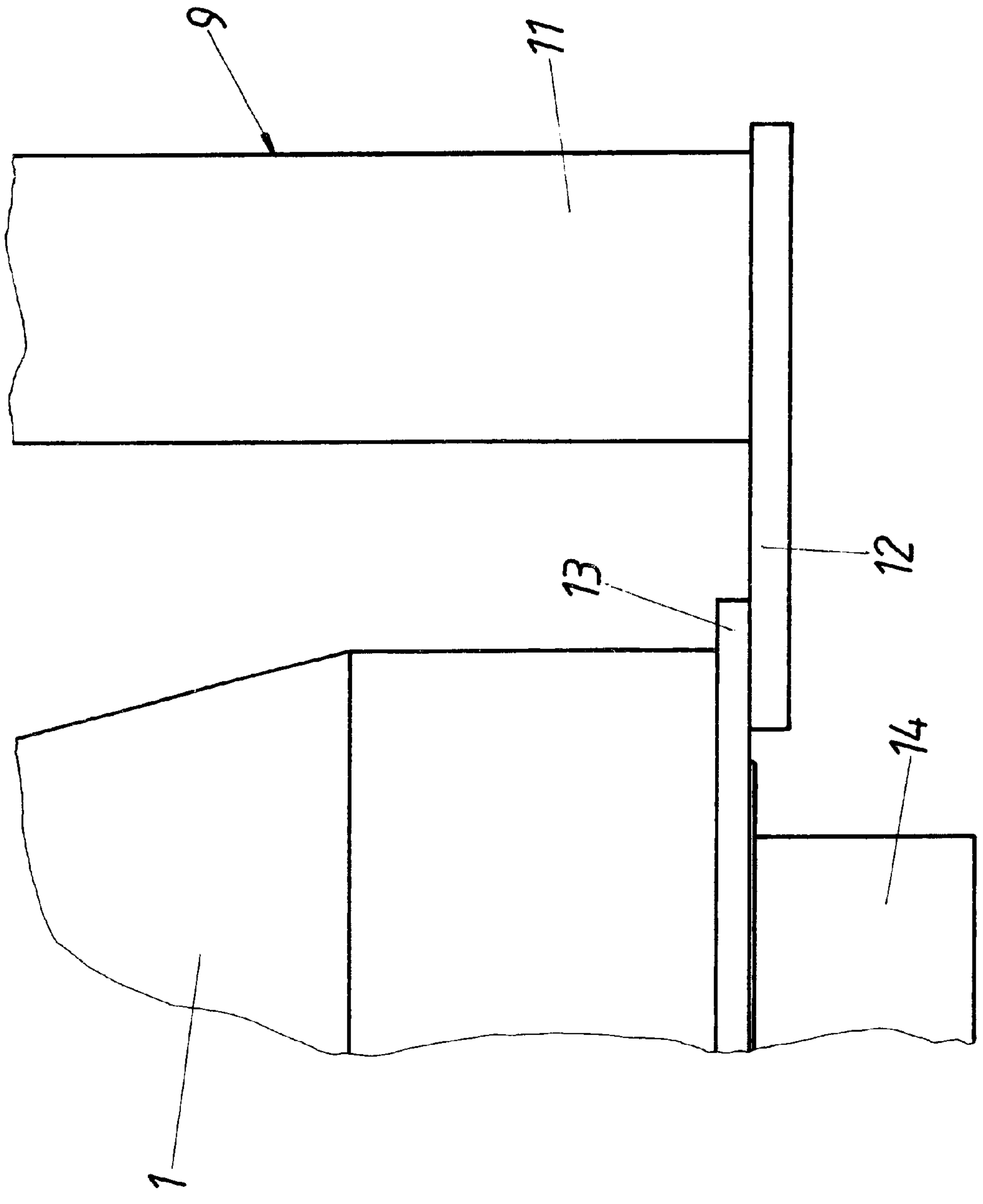
FIG. 4 shows a magnified, partial lateral view of the bottom ring of a workpiece gripped from below by a dog attached to the hoist.

Laterally adjacent to the chambers 2 positioned next to one another provision is made for tracks 5 for an overhead travelling crane 6, along the bridge 7 of which a crab 8 with a lifting and a lowering hoist 9 for the workpieces 1 can be slid. This hoist 9 consists of a supporting frame 10 which travels above the workpieces 1 to be hoisted and on which the brackets 11 for encompassing the exterior of the workpieces are arranged, as can be seen in FIG. 3. At the lower ends of the brackets 11 provision is made for dogs 12 which can be positioned perpendicular to the vertical axis of the tubular workpiece 1 and in accordance with FIG. 4 grip under a flange 13 of the metallic bottom ring 14 on which the workpiece 1 is positioned and by means of which it can be elevated, encompassing the tubular workpiece 1. The dogs 12 can be adjusted into a position at right angles to the axis of the workpiece 1 by moving the brackets 11 laterally, by actuating the dogs 12 at right angles to the brackets 11, or by rotating the brackets 11 upon their axis as provided for in this embodiment of the arrangement.

Figure 1:
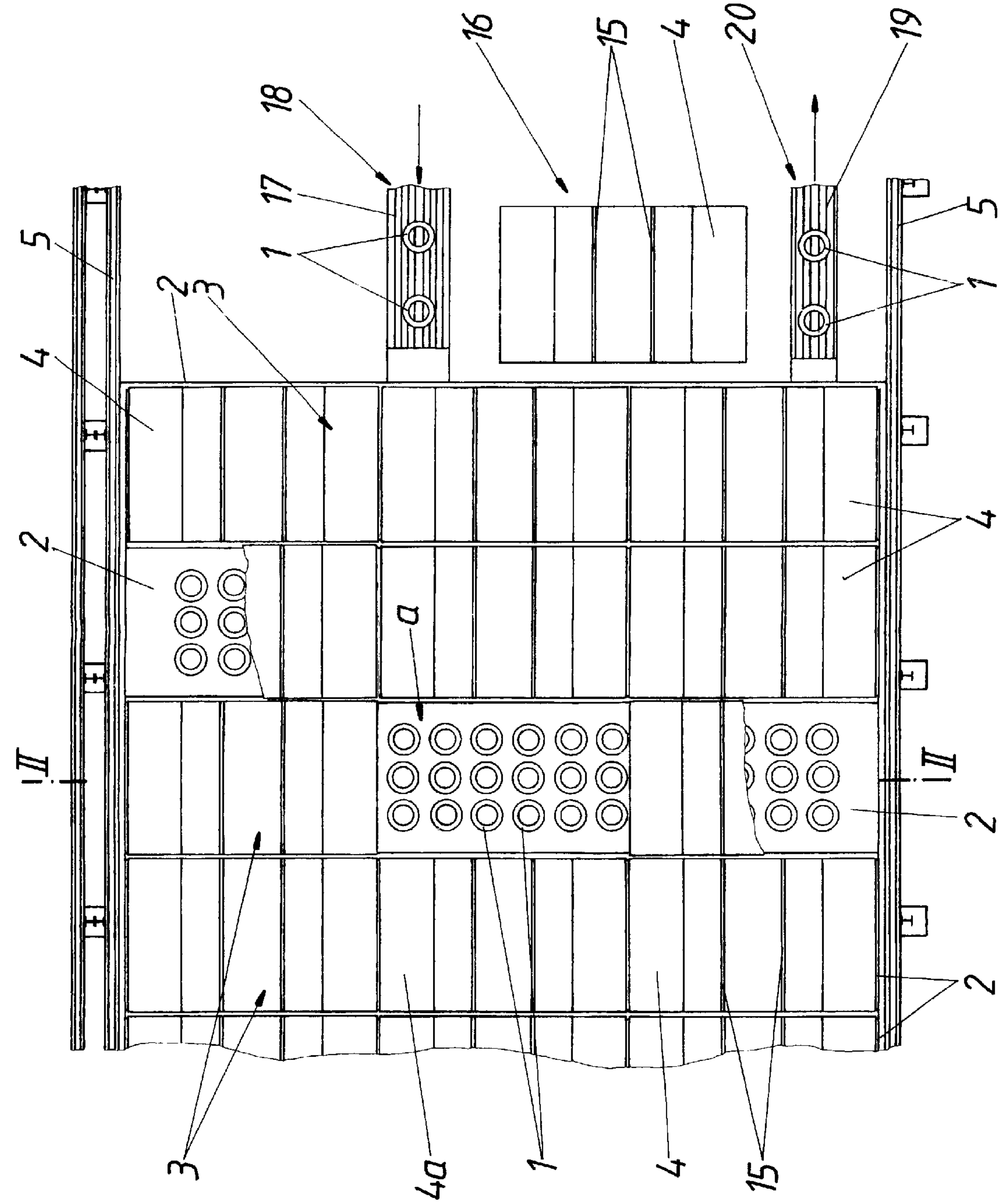
FIG. 1 shows an installation in accordance with the invention for hardening concrete tubular workpieces in schematic view from above.
Figure 2:
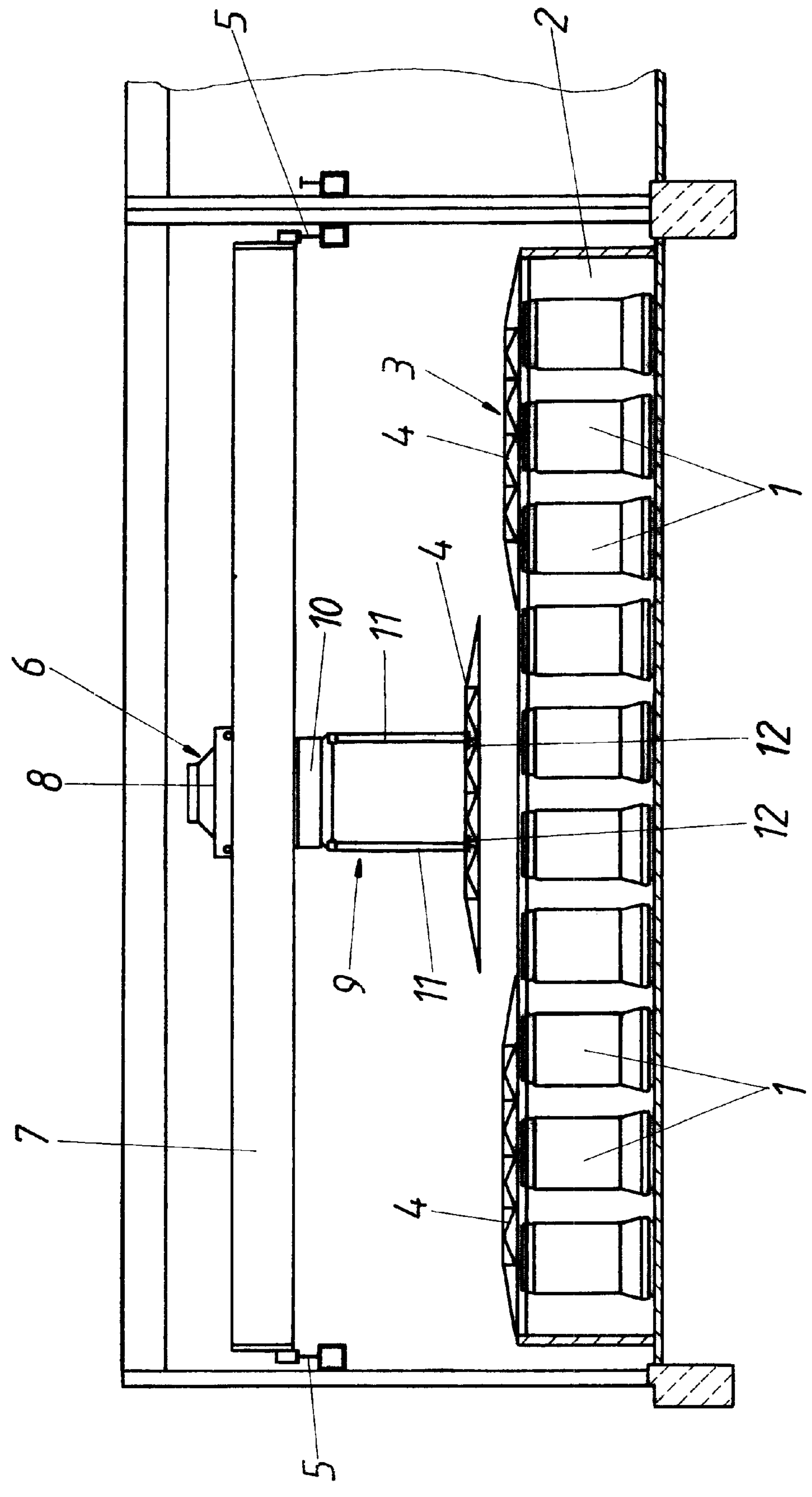
FIG. 2 shows this installation in a simplified, magnified cross-section for II—II indicated in FIG. 1 illustrating a section of the cover plate lifted by the overhead crane.
Figure 5:
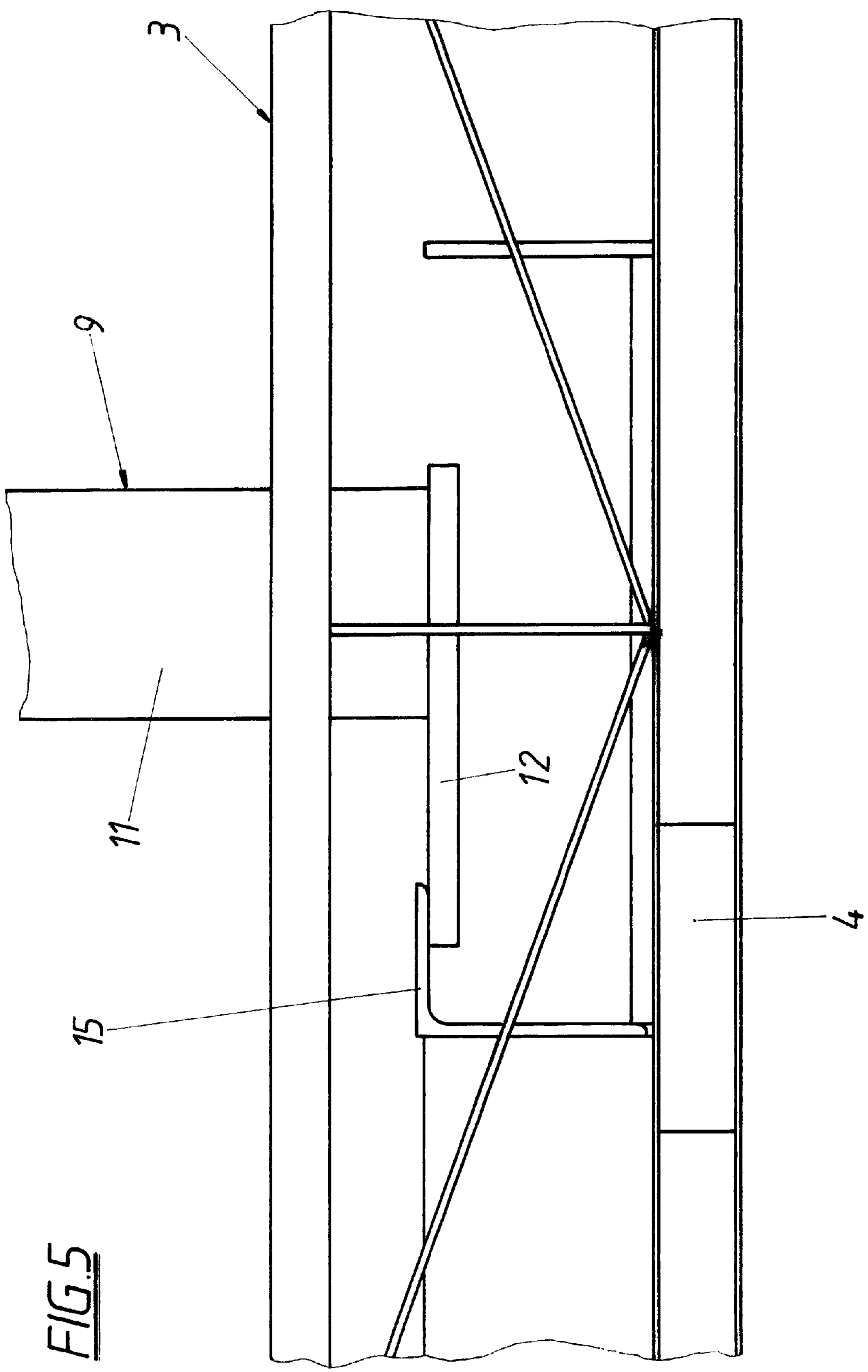
FIG. 5 shows a magnified, partial, lateral view of a section of a cover plate in the area of a recess for a dog attached to the hoist.

In order that not only the workpieces 1, but also the cover plate segments 4 can be lifted by the overhead travelling crane 6, the overhead travelling crane 6 must be provided with the necessary holding devices for the cover plate segments 4. Although special holding devices for this purpose are conceivable, a particularly simple construction constellation results when the hoist 9 for the workpieces 1 can be utilised. For this purpose and in accordance with FIG. 5 the cover plate segments 4 have pick-up recesses 15 for the dogs 12 on the brackets 11, with the recesses designed to accommodate the bracket arrangement. Therefore, if the hoist 9 in the embodiment provided for is lowered in relation to a cover plate segment 4, the dogs 12 on the lower ends of the brackets 11 enter the area in which the recesses 15 are located, so that the pick-up recesses 15 are gripped from beneath by the dogs 12 after the brackets 11 have been rotated as shown in FIG. 5. In this manner, the cover plate segments 4 coupled to the hoist 9 for the workpieces 1 can be lifted from the chamber 2 involved by means of the overhead travelling crane 6 as shown in FIG. 2. The cover plate segment 4 which has been lifted off can be placed in a stackable storage facility 16 which in accordance with FIG. 1 is located directly adjacent to the rows of chambers 2 in the direction of travel of the overhead travelling crane 6. The stackable storage facility 16 is located advantageously between the discharge station 17 of the feeder conveyor 18 for the workpieces 1 requiring hardening and the charging station 19 of the discharge conveyor 20 for the hardened workpieces 1. This spatial arrangement of the feeder conveyor 18 and the discharge conveyor 20 in relation to the stackable storage facility 16 for the cover plate segments 4 means that any empty runs which may have been necessary for the overhead travelling crane 6 between picking up the cover plate segments 4 and the workpieces 1 are avoided in an advantageous manner.

However, it is not at all necessary to always convey the cover plate segments 4 removed from the chambers 2 to the stackable storage facility 16 in order to remove them from the stackable storage facility 16 to close the chambers 2. The loading circumstances can be made much more advantageous if, for instance in accordance with FIG. 1, the chamber section to be closed, 'a', is not closed using a cover plate segment 4 from the stackable storage facility 16, but by using the cover plate segment **4*a* from the neighbouring chamber 2, which is to be charged with new workpieces 1. Therefore, the cover plate segment 4*a* only needs to be moved the distance of one chamber 2 in order to close the previously open chamber 2 in area 'a' on the one hand and to open a section of a chamber 2 to be recharged on the other. Then the already treated and fully hardened workpieces 1 can be removed from the open chamber using the overhead travelling crane 6 and replaced with workpieces to be treated which are conveyed by the feeder conveyor 18, while the hardened workpieces 1 are removed from the installation by the discharge conveyor 20. This charging and discharging procedure of the chambers 2 is repeated chamber after chamber until the final chamber in the sequence of chambers has been opened and the cover plate segment 4 required to close this chamber must be taken from the stackable storage facility 16. The cover plate segments 4 stored in the stackable storage facility 16 are those from the first chamber 2** opened in the charging sequence.

What is claimed is:

1. An installation for hardening tubular concrete workpieces in chambers which are open at the top, can be closed with cover plates, can be filled with vapour and which can be charged with the aid of an overhead travelling crane bearing a hoist for the workpieces, with the overhead travelling crane (6) for the workpieces (1) having a device for picking up the cover plates (3) of the chambers (2).

2. An installation in accordance with claim 1 whereby the cover plates (3) of the chambers (2) are subdivided into cover plate segments (4) which can be removed separately.

3. An installation in accordance with claim 1 whereby a stackable storage facility (16) for the cover plates (3) is located directly adjacent to the rows of chambers (2) arranged parallel to the direction of travel of the overhead travelling crane (6).

4. An installation in accordance with claim 3 whereby a stackable storage facility (16) for the cover plates (3) is arranged in the area of the discharge station (17) of the feeder conveyor (18) for the workpieces (1) to be hardened and/or in the area of the charging station (19) of the discharge conveyor (20) for the fully hardened workpieces (1).

5. An installation in accordance with claim 1 with an overhead travelling crane which has a workpiece hoist consisting of a supporting frame running above the standing workpieces to be picked up and of brackets arranged on the hoist to encompass the external diameters of the workpieces, whereby said brackets have dogs which can be moved into a position perpendicular to the axis of the workpiece and grip underneath a flange on the bottom ring of the workpieces, whereby the hoist (9) for the workpieces (1) constitutes the device for picking up the cover plates (3) of the chambers (2) and the cover plates (3) have pick-up recesses (15) which are designed to accommodate the arrangement of the brackets and which are for the dogs for which provision is made on the brackets (11) of the hoist (9).

6. A procedure for charging an installation with workpieces to be hardened in accordance with claim 1, whereby the cover plates of the chambers in the course of the chamber charging procedure are opened and then closed again after the chamber has been discharged and charged, whereby the chambers are closed after their charging in each case with the cover plate of the previously opened chamber which is subsequently to be charged.

* * * * *